Figure 1:
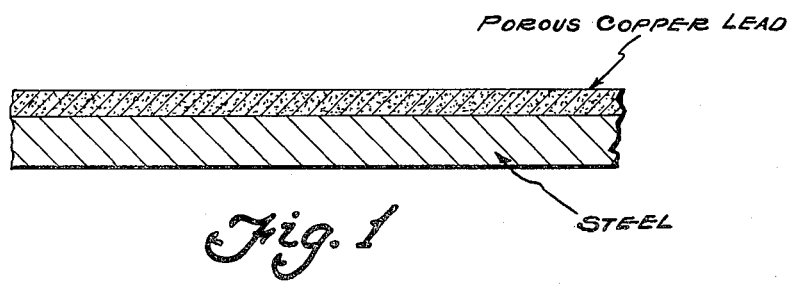

Patented Feb. 12, 1952

2,585,430

UNITED STATES PATENT OFFICE 2,585,430

METHOD OF MAKING BEARINGS

Alfred L. Boegehold, Detroit, Mich., assignor to General Motors Corporation, Detroit, Mich., a corporation of Delaware Application March 1, 1947, Serial No. 731,865

3 Claims. (Cl. 29—189)

This invention relates to metal structures and is particularly concerned with bearings and the like formed from metal powders.

It is therefore an object of the present invention to make an improved bearing or bearing layer wherein a mixture of metal powders is utilized as a starting ingredient and wherein one of said powders is a copper lead powder and the other ingredient is a cupreous metal powder.

In carrying out the above object, it is a further object to make a copper lead bearing wherein a mixture of copper powder and copper lead powder is utilized for forming the bearing or bearing layer.

A further object of the invention is to provide a method for improving the porous structure of copper-lead bearings wherein the starting ingredients include copper-lead powder together with another cupreous powder, such as, copper, copper-tin, copper-nickel, copper-lead of different composition or any other alloy of copper which will combine with copper-lead.

Another object of the invention is to provide a method for making a material including copper and lead which is satisfactory for use in bearings and/or related uses such as clutches, and the like, as a protective layer over some other metal; as a brazing medium etc. In all cases where a porous layer is not desired, it is a further object of the invention to contemplate the compacting of the layer either hot or cold to the desired density.

Another object of the invention is to utilize the bearing layers herein disclosed in composite structures wherein the bearing layer is supported on and bonded to a strong metal backing member.

Further objects and advantages of the present invention will be apparent from the following description, reference being had to the accompaning drawing, wherein preferred embodiments of the present invention are clearly shown.

Figure 2:
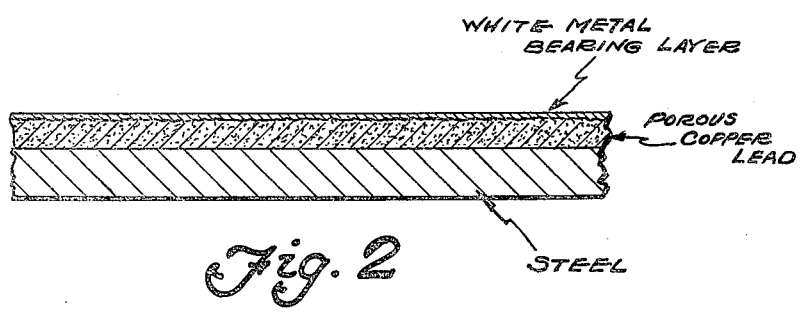

In the drawing:

Fig. 1 shows a cross section of stock made under the methods claimed herein, wherein a porous metal matrix is bonded to the steel and Fig. 2 shows a modification of the invention wherein a porous metal matrix, bonded to steel, is impregnated with a white metal bearing alloy.

The use of copper-lead as a bearing metal has been proposed and bearings have been made using this material with a degree of success. When bearings of this type are manufactured by conventional sintering procedures much difficulty is experienced in the sweating of the lead whereby manufacture of bearings containing copper-lead is a difficult procedure and one which must be very closely controlled in order to obtain a workable product. My invention has to do with the simplification of these manufacturing methods whereby useable and highly satisfactory copper-lead bearings will be obtained without the close control heretofore required in the manufacturing thereof.

I have found that copper-lead bearings can be satisfactorily produced by mixing pure copper powder, for example, with copper-lead powder and then heating said mixture in the desired condition at a temperature intermediate the melting points of the copper-lead powder and the copper powder. The addition of lead to copper causes a lowering of the melting point of the resulting powder whereby the copper-lead powder will melt at a lower temperature than the copper powder and act as a bonding agent for the copper powder without melting the same. Thus a strong copper matrix is obtained interspersed with lead, which does not have any effect on the functional qualities of the copper or the copper bond below predetermined limits disclosed hereinafter. Also, a satisfactory distribution of lead is obtained without the usual sweating or exudation of the lead whereby a strong copper-lead mixture is present and the copper will be present as a bearing material capable of carrying high loads.

In practice, the copper-lead powder usually contains between 10 and 40% of lead. In mixing the copper-lead powder with either pure copper powder, cupreous alloy powders or for that matter with another copper-lead powder of different lead content, it should be understood that the total percentage of lead in the finished article should vary between 2.25 and 38% of the total weight of the article. Thus, for example, if pure copper powder is mixed with a copper-lead powder including 10% lead, the low limit for the copper-lead powder would be 2.25% of the total mixture, whereas if the copper-lead powder contained 30% lead, the low limit for copper-lead powder would be 7.5% of the mixture, etc. In each case there would be 2.25% of lead present in the finished product. On the high side of the range, for example, if pure copper powder is mixed with copper-lead powder containing 40% lead the high limit for the copper-lead powder would be 95% of the total mixture in order to yield 38% lead content in the finished product.

Choice of the most desirable copper-lead powder will vary with the specific application to which the product is to be used. Generally a high lead, copper-lead powder will permit a wider temperature differential in the heating step. However, the percentage lead in the total mixture will also control hardness of the product to some extent and the type of bond. For example, the lead content of the total mixture at which the copper bond changes to a lead bond is between 31% and 40% total lead depending on conditions of manufacture. For these reasons, choice of powders and control of lead content is preferably determined by experimental runs with the specific use of the finished bearing in mind.

The mixture of powders is then applied on a suitable supporting surface and heated at a temperature above the melting point of the copper-lead powder but below the melting point of the copper powder. This heating temperature will obviously vary according to the lead content of the copper-lead powder but in the case of pure copper powder will be below 1950° F., which approaches the melting point of pure copper at 1981° F. The heating may be carried out for any suitable period as is well known in the art, for example, from 15 to 40 minutes under non-oxidizing conditions. The part may then be cooled under suitable conditions.

It is obvious that where cupreous alloys are used instead of pure copper that the heating temperature must be above the melting point of the copper-lead powder but below the melting point of the other cupreous powder used.

Control of the porosity of the part may be obtained prior to or during heating by application of pressure, or the part may be compacted after heating to the desired density. The supporting surface may be graphite, etc., if no adherence is desired or steel or other strong supporting metal such as nickel, Monel, copper, bronze, etc., or any suitable metal or alloy which has a melting point higher than the heating temperature if a composite structure is to be formed. In these cases, the copper-lead layer will bond to the surface of the steel, etc. Obviously, if a metal support is utilized, the surfaces thereof should be cleaned of oxides, dirt and grease prior to the application of the metal powder thereto to assure a coextensive bond.

If desired, the metal powders may be pressed onto the surface of the support, prior to heating, or the powder layer may be applied in the non-compacted condition as desired, either of these expedients being within the scope of this invention.

A modification of the invention concerns the mixing of two different lead content powders, for example, copper-lead powder having from two to ten percent lead therein with powder containing from fifteen to thirty-six percent lead therein. In this case a heating temperature intermediate the melting points of the two-copper-lead powders is required. It is apparent that the temperature control must be close since at no time should the lower lead content powder be heated to its melting point.

In cases where other alloys are desired, it is possible to utilize copper alloy powders such as copper-tin powder, copper-nickel powder, etc., wherein the melting point of the copper alloy powder is above the melting point of the copper lead powder. In all of these instances, it is necessary to check the melting points and it is desirable to make a trial heating run in order to determine the most desirable heating temperature.

Another embodiment of the invention contemplates the use of a bearing surface different in character than the main body of the bearing which is copper lead. In this embodiment a white metal bearing alloy, such as lead base bearing alloys or babbitts, may be used. This bearing surface may be applied by impregnating the porous copper lead matrix with the bearing alloy or by application by any other well known expedient. The bearing alloy may be used as the bearing surface as applied, or if impregnated into the porous copper lead matrix, may be machined off so as to expose desired portions of the matrix material to make up a composite bearing surface.

The important limitations of my process are: The quantities of the lower melting point powder used, which should not exceed 95% of the total mixture which would yield 38% lead therein when a 40% lead, copper-lead powder is used. The heating temperature must always be above the melting point of the low melting powder, but below the melting point of the higher melting point powder. Other limitations such as heating atmospheres and times and densities of the layer are all well-known in the art and the methods for controlling these factors are also of common knowledge.

Bearings made by the present method will have a very satisfactory distribution of the lead throughout, which enables better bearing performance to be obtained. Furthermore, during the manufacture of these bearings, the usual difficulties experienced with exudation of the lead are not present which considerably simplifies the process.

Copper-lead powders are obtainable on the market and are made by a number of processes wherein the copper and lead are found in the desired amounts in each particle of the powder. Copper-lead powder referred to herein is of the type wherein copper and lead in substantially constant quantities are found throughout the mixture and wherein such distribution is substantially present in each particle of the powder.

While the embodiments of the present invention as herein disclosed, constitute preferred forms, it is to be understood that other forms might be adopted, all coming within the scope of the claims which follow.

What is claimed is as follows:

1. In a method of making a copper-lead bearing, the steps of, mixing pure copper powder with copper lead powder wherein the lead in the finished bearing is from 2.25 to 38%, and then heating the mixed powder at a temperature above the melting point of the copper-lead powder and below 1981° F., for a time sufficient to cause the copper-lead powder to melt and to coat and bond the particles of the copper powder together.

2. The process of making a composite bearing member, the steps of, mixing copper-lead powder having from 10 to 40% lead therein with cupreous alloy powder of higher melting point than the copper lead powder, wherein the quantity of copper lead powder in the total mixture is such that the lead content of the bearing is from 2.25 to 38%, distributing said mixed powders upon the surface of a higher melting point strong metal support, heating the support with the powder thereon at a temperature above the melting point of the copper-lead powder and below the melting point of the cupreous alloy powder, for a time sufficient to cause the copper-lead powder to melt and to coat and bond the particles of the cupreous alloy powder together and form a copper-lead layer having a substantially uniform distribution of lead therethrough and simultaneously to cause the bonded together copper-lead layer to metallurgically attach itself to the surface of the solid metal support, and then cooling the composite bearing member so formed.

3. The method of making a composite bearing having a high lead copper-lead layer bonded to a steel backing member, comprising the steps of, mixing a copper-lead powder with copper powder wherein the total lead in the finished heated bearing is 2.25% to about 31%, and then heating the mixture of powders at a temperature intermediate the melting points of the lower melting point copper-lead powder and the higher melting point copper powder in a layer of suitable thickness upon a steel backing member and under suitable atmospheric conditions for causing the metal powders to bond together through the melting of the copper-lead powder and the coating of the copper powder thereby into a strong copper-lead layer and simultaneously to bond to the backing member through the medium of a copper bond.

ALFRED L. BOEGEHOLD.

REFERENCES CITED

The following references are of record in the file of this patent:

UNITED STATES PATENTS

| Number | Name | Date |
| --- | --- | --- |
| 1,986,197 | Harshaw | Jan. 1, 1935 |
| 2,158,461 | Koehring | May 16, 1939 |
| 2,196,875 | Sandler | Apr. 9, 1940 |
| 2,198,240 | Boegehold | Apr. 23, 1940 |
| 2,198,253 | Koehring | Apr. 23, 1940 |
| 2,226,263 | Sandler | Dec. 24, 1940 |
| 2,338,858 | Lignian | Jan. 11, 1944 |
| 2,384,892 | Comstock | Sept. 18, 1945 |